United States Patent
Hamatani et al.

[11] Patent Number: 5,687,452
[45] Date of Patent: Nov. 18, 1997

[54] HYDRAULIC SNUBBER FOR AIRCRAFT

[75] Inventors: Tomio Hamatani, Seattle; Sun Gil Kim, Redmond; Donald K. Franklin, Renton, all of Wash.; Michael P. Conner, Danville, Vt.

[73] Assignee: The Boeing Company, Seattle, Wash.

[21] Appl. No.: 432,846

[22] Filed: May 2, 1995

[51] Int. Cl.$^6$ ............................................. E05F 5/02
[52] U.S. Cl. .......................... 16/82; 137/493; 188/312
[58] Field of Search ........................ 137/493; 188/312; 16/82, 78, 56, 58, 61, 84, 79, 67

[56] References Cited

U.S. PATENT DOCUMENTS

| | | | |
|---|---|---|---|
| 3,561,574 | 2/1971 | Dickinson et al. | 188/312 |
| 3,638,885 | 2/1972 | Reed | 188/312 |
| 3,739,808 | 6/1973 | Landherr | 137/493 |
| 4,084,668 | 4/1978 | Rybicki | 188/312 |
| 5,178,240 | 1/1993 | Houghton | 188/315 |
| 5,529,152 | 6/1996 | Hamilton et al. | 188/299 |

*Primary Examiner*—Daniel W. Howell
*Assistant Examiner*—Christopher Kirkman
*Attorney, Agent, or Firm*—Christensen O'Connor Johnson & Kindness PLLC

[57] ABSTRACT

A snubber is disclosed for use on an airplane translating door hinge arm (13) comprising a hydraulic device (41) and a flow regulation system (40). The hinge arm (13) includes sprockets (25, 27) placed at the ends (15, 17) of the hinge arm (13). Roller chain pieces (31) rotate partially about the sprockets (25, 27). A pneumatic actuator (33) having a through-rod (37) and housing (35) is located on one side of the hinge arm (13). The actuator housing (35) is supported by a support member (23) integral with the hinge arm (13). The ends of the actuator through-rod (43) are each coupled to first ends of each of the roller chain pieces (31). The hydraulic device (41) comprising a housing (47), a through-rod (43), a piston 45, a first compartment (49), a second compartment (51), and hydraulic fluid, is also supported by the support member (23). The ends of the hydraulic device through-rod (43) are each coupled to second ends of each of the roller chain pieces (31). The hydraulic device (41) is located on the side of the hinge arm (13) opposite the side having the actuator (33). Also provided is a snubber fluid flow regulation system (40) comprising first and second flow regulators (59, 65) and first and second high pressure relief valves (61, 67), one each for use during door opening and door closing. A compensator (71) is also provided in the fluid flow regulation system (40) to hydraulically compensate the snubber (41) during temperature changes and to supply make-up fluid in case there is external leakage.

19 Claims, 2 Drawing Sheets

HYDRAULIC SNUBBER FOR AIRCRAFT

FIELD OF THE INVENTION

The present invention relates to snubbers, and more particularly, to hydraulic snubbers.

BACKGROUND OF THE INVENTION

Airplanes rely on specialized doors for passenger boarding and deboarding, galley servicing, cargo loading, maintenance access, emergency egress, etc. Some airplane doors are hinged to the fuselage, others slide into a cavity in the wall of the fuselage, and still others translate by moving outward and then forward along the fuselage of the airplane. During door usage, the possibility exists for various applied forces (such as, effects of gravity, a pressure difference between the cabin and the outside air, or a high speed wind) to cause an airplane door to rapidly move open or shut. A rapidly moving door could be a serious hazard, capable of injuring people near the door. A rapidly moving airplane door can also cause yielding or failure of the airplane fuselage, door frame, hinge arm, or hinge linkages. In certain instances, a large force applied to a door can completely severe the door's connection to the airplane.

Snubbers are included in airplane door systems to control the rate of door opening and closing. Many types of doors require the use of snubbers, including translating doors, top hinged canopy doors, bottom hinged doors, upward opening plugged doors, overhead doors, etc. The primary purpose of a snubber is to enhance personnel safety and door integrity by limiting the peak forces applied to the door mechanisms. Snubbers are usually hydraulic devices that absorb energy-similar to shock absorbers. Various types of snubbers exist, including piston, rotary, gear, vane, blade, etc. The piston type comprises a housing in the form of a cylinder, a piston mounted in the cylinder, a rod attached to the piston, and hydraulic fluid. Hydraulic fluid flow between chambers located on either side of the piston controls the rate of movement of the piston, and, thus the rod. One commonly used hydraulic fluid flow passageway between the chambers is an orifice in the piston or housing. When a force is exerted upon the rod to urge it in a particular direction, hydraulic fluid flows from one side of the piston to the other side, through the orifice. If the hydraulic fluid flow passageway between the chambers is a simple fixed-size orifice, pressure of the fluid from one side of the piston to the other side will be directly proportional to the flow rate squared through the orifice. If the hydraulic fluid flow passageway is a flow regulation orifice, the passageway will be provided in a conduit connecting the chambers, and the orifice size will be variable. A typical flow regulator maintains a constant rate of fluid flowing through the orifice by adjusting the orifice size. The greater the force being applied to the rod, the smaller the orifice size.

Operationally, translating airplane doors are supported by a hinge arm rotatably connected at one end to a door frame and at the other end to the door. A roller chain is positioned about a first sprocket mounted on a hinge pin located at one end of the hinge arm and about a second sprocket mounted on a hinge pin located at the other end of the hinge arm. Under non-emergency situations, the door is opened or closed manually. When a manual force is applied to the door, it causes the roller chain to translate, effecting rotation of the door hinge arm and translation of the door between its open and closed positions. In emergency situations, an actuator is provided to power the door open. The actuator is located on one side of the hinge arm, in-line with the roller chain. The actuator includes a through-rod that replaces a portion of the chain. When the actuator is activated, it causes the actuator through-rod to translate. This action causes the roller chain to translate, again effecting rotation of the door hinge arm and translation of the door between its closed position to its opened position. As the door moves, the door is maintained at an attitude approximately parallel to the longitudinal centerline of the airplane. The maximum velocity of the door is controlled by a snubber installed between the door and the door frame.

Although snubbers are useful devices, current snubbers can have undesirable characteristics. A first such disadvantage (mainly applicable to some current linear-type snubbers) is a potential spiking load due to the snubber's location in the overall door system. When a snubber is located between two structural points (i.e., the door frame and the door, or the hinge arm and the door), the angle of the snubber relative to the door will change as the door opens or closes. Likewise, the available snubbing force will vary as the door angle varies. The resulting geometry can create sections of door travel in which the snubber is less effective. This occurs typically at mid-door rotation. While the start and end portions of the door travel path will receive snubbing force, the middle position will receive less snubbing force. This allows the door's velocity to increase during mid-door rotation, requiring a large, or "spike," snubbing force near the end of travel to reduce the door's velocity and prevent the door from slamming. Many current door snubbers are unable to deal effectively with the spike loads created by snubber-door geometry.

A second disadvantage of current snubbers (both linear and rotary types) regardless of their location in the overall door system, is that they are frequently unable to absorb large energies in a controlled manner. For example, when a large force is applied to a door while the door is being opened or closed, the door's velocity will increase. Snubbers respond to the door's increased velocity by hydraulically countering the force to prevent the door from moving too rapidly. While a fixed-size orifice snubber will damp the door's velocity, because the orifice remains a constant size, the door speed will still increase as the force applied to the door is increased. If the applied force is very large, the door's velocity increase will be relatively very large. As mentioned above, a rapidly moving door can be a hazard to personnel near the door. The rapidly moving door will end its movement by slamming to a stop, potentially causing damage to the airplane fuselage, as well as to the door. To prevent the door from moving rapidly, a snubber with a smaller orifice could be used. However, such a snubber would make the manual operation of the door more difficult and time consuming.

Flow regulator snubbers as formed in accordance with the present invention have a partially more desirable response than fixed orifice type snubbers in that they prohibit the door velocity from significantly increasing by providing increased resistance in the fluid flow resulting in increased snubbing force to counter increased door velocity.

Regardless of type, any snubber that is unable to absorb large energies and control velocities quickly enough, results in the application of forces to door components that may cause them to yield or fail. Ideally, the location and design of a snubber should be such that large forces are dissipated in a controlled manner, i.e., provide a balance between too much and too little snubbing. An ideal snubber should be located and designed such that large energies are absorbed fast enough to prevent door components from breaking, while still controlling the door's velocity in order to stop the door without slamming. The snubber location and design should allow a door to move fast enough to be comfortably moved manually, but slow enough not to injure anyone. Neither the location nor the design of present snubbers meet all of these ideal requirements. Thus, a need exists for a new and improved snubber for an airplane door system that is designed and located to provide snubbing force throughout the entire path traveled by the door as it moves between its opened and closed positions, while allowing the door to be easily opened when very little force is applied. The snubber design and location should allow the snubber to counteract large applied forces, in order to slow door movement and prevent possible injury to personnel. The snubber should be capable of quickly absorbing energies and controlling door velocities in order to protect the components of the door from yielding or failing during the door's travel, while preventing a buildup of velocity at the end of the door's travel. The present invention is directed to fulfilling this need.

SUMMARY OF THE INVENTION

In accordance with the present invention, a hydraulic snubber that is ideally suited for use on an airplane translating door hinge arm is provided. The door hinge arm is rotatably attached at one end to the door frame and at the other end to a door by hinge pins. Mounted on the hinge pins are first and second sprockets, one located at each end of the hinge arm. Two roller chains pieces are partially looped around the sprockets, one chain associated with each sprocket. A pneumatic actuator is provided, comprising a housing in the form of a cylinder, a piston mounted in the cylinder, and a through-rod passing through the cylinder and connected to the piston. The actuator through-rod connects one end of one of the roller chains to one end of the other roller chain. The snubber comprises a hydraulic device that joins the other ends of the chains. The hydraulic snubber is located generally parallel to the actuator. The hydraulic device includes a housing in the form of a cylinder, a piston mounted in the cylinder, and a through-rod passing through the cylinder and connected to the piston. The actuator and snubber housings are supported by a support member that is integral with the hinge arm.

During non-emergency situations, a manually applied force causes the roller chain to translate around the sprockets. This action causes the hinge arm to rotate relative to the door frame, and the door to rotate relative to the hinge arm. In emergency situations, pneumatic pressure is applied to one side of the actuator piston to cause the actuator through-rod to move, which forces the roller chain to translate and the door to open. As the door moves between its closed and opened positions, snubbing force is provided by the hydraulic device.

In accordance with further aspects of the present invention, the snubber also includes a fluid flow regulation system that controls the amount of snubbing force available, depending on the applied force to the door. The fluid flow regulation system comprises two flow regulators, one for each direction of door travel (i.e., door opening and door closing) during normal operating conditions.

In accordance with yet other aspects of this invention, the fluid flow regulation system also includes two high pressure relief valves for limiting large input forces to the snubber, one for each direction of snubber piston travel.

In accordance with still other aspects of this invention, low pressure check valves are provided throughout the snubber fluid flow regulation system to ensure that the fluid flows through the appropriate fluid path.

In accordance with still further aspects of this invention, a compensator is provided for hydraulically compensating the snubber for hydraulic leaks, thermal expansion, etc.

From the foregoing description, it will be appreciated that a new, and distinctly better, snubber whose position and design is ideally suited for use on an airplane translating door hinge arm is provided by the present invention. The location of the hydraulic device between the roller chain pieces allows the snubber to provide snubbing force throughout the entire path traveled by the door, thus controlling the angular velocity of the hinge arm for its total travel, thus reducing the application of spike loads to the snubber at the ends of the path of door travel. The flow regulators of the snubber's fluid flow regulation system allow the door to be easily moved during normal use by the application of minimal force. The flow regulators increase snubbing capability in response to larger applied forces in order to prevent the door from moving too quickly. The high pressure relief valves of the snubber's fluid flow regulation system limit very large applied loads quickly, thereby protecting the internal door mechanisms from yielding or failing. The combination of the flow regulators and the high pressure relief valves prevent a buildup of excessive velocity during the door's travel.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Although, the present invention was developed for, and is described in connection with, an airplane translating passenger entry door, it is to be understood that the invention may also find use in other snubber applications, including other airplane snubber applications. Examples of such use are to control flutter on aircraft control surfaces and to absorb energy in landing gear systems.

The following paragraphs describe a snubber formed in accordance with the present invention and its preferred location in an airplane translating door system. The snubber is comprised of a hydraulic device 41 and a flow regulation system 40. The following description focuses first on the hydraulic device 41 in terms of its placement in the overall door system and the operation of the snubber therein. (Shown generally in FIGS. 1 and 2.) Next, a detailed description of the flow regulation system 40 is given in terms of its elements and the effect those elements have on the performance of the snubber. (Shown generally in FIG. 3.)

Figure 1:
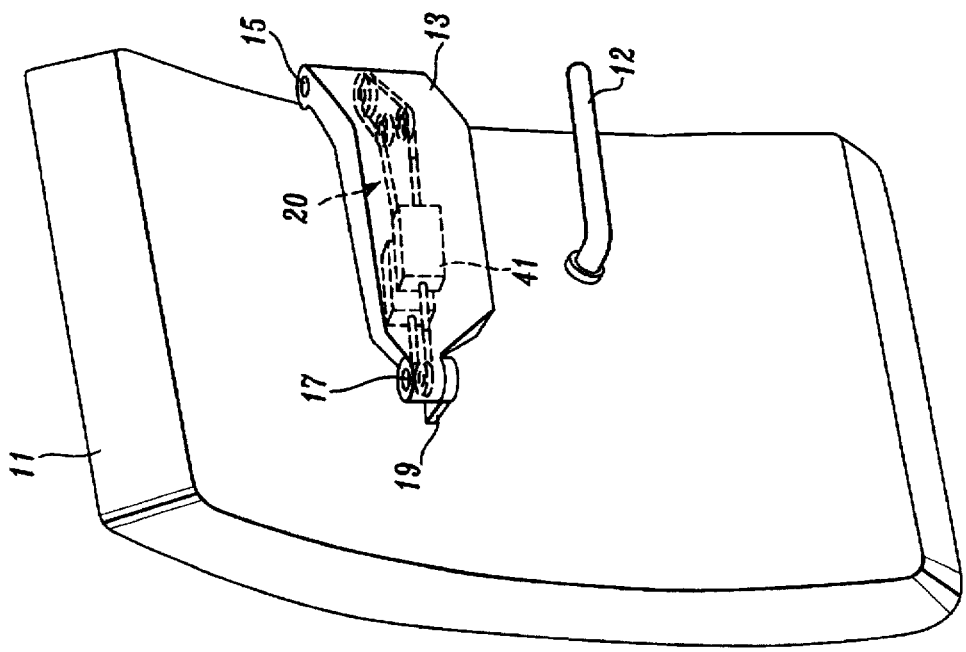
FIG. 1 is an pictorial view of the interior of selected components of an airplane translating passenger door showing the location of a door hinge arm relative to the door and in dashed lines, the location of the hinge arm components that control the movement of the door including a snubber formed in accordance with the present invention.

FIG. 1 is a pictorial view of selected components of an airplane translating passenger door 11. More specifically, FIG. 1 shows a door 11, a hinge arm 13, an operating handle 12, first and second hinge pins 15, 17, a door bracket 19, translation-producing hinge arm components 20, and the hydraulic device 41 of a snubber formed in accordance with the present invention. Both the operating handle 12 and the hinge arm 13 are located on the side of the door 11 internal to the airplane. The door hinge arm 13 has a dog-leg shape. Both the operating handle 12 and the door hinge arm 13 are of a type known in the art. The first hinge pin 15 rotatably connects one end of the hinge arm 13 to a door frame bracket (not shown). The second hinge pin 17 rotatably connects the other end of the hinge arm 13 to the door bracket 19. Shown in dashed lines in FIG 1 within the hinge arm 13 are the translation-producing hinge arm components 20 that control the movement of the door and the hydraulic device 41. These elements are better seen in FIG. 2 and are described next.

Figure 2:
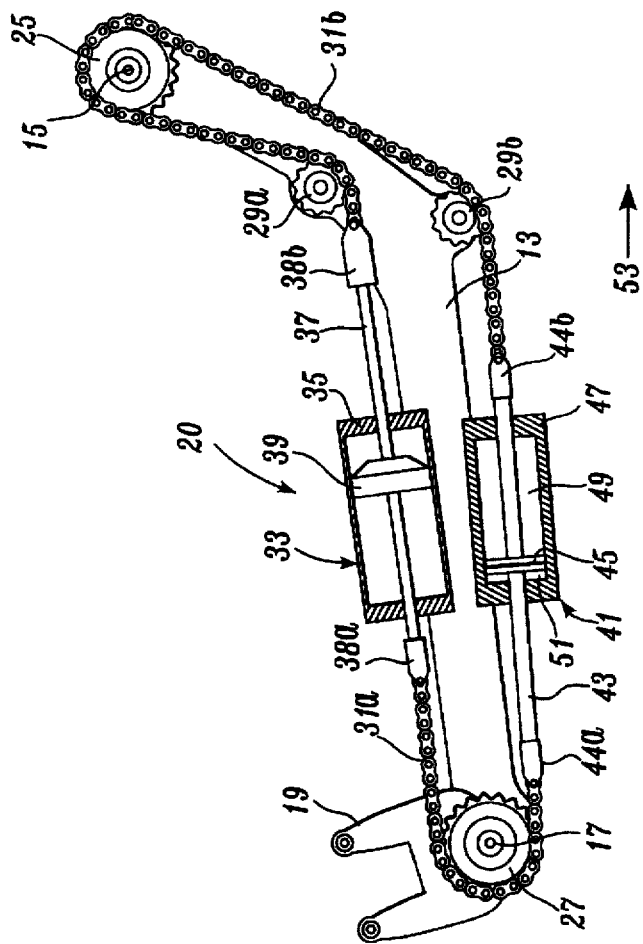
FIG. 2 is a plan view of the door hinge arm components that control the movement of the door including a snubber formed in accordance with the present invention shown in FIG. 1.

FIG. 2 is a plan view of the hinge arm components that control the movement of the door 11 and of the snubber hydraulic device 41. The hinge arm components include first and second sprockets 25, 27; first and second idler sprockets 29a and 29b; two pieces of roller chain 31a, 31b; and a linear pneumatic actuator 33. The first sprocket 25 is mounted on the first hinge pin 15, and the second sprocket 27 is mounted on the second hinge pin 17. The first idler sprocket 29a is located near the inside turn of the dog-leg shaped hinge arm 13, and the second idler sprocket 29b is located near the outside turn.

One of the roller chain pieces 31b is positioned about the first hinge pin sprocket 25 and about the first and second idler sprockets 29a and 29b, thus, encompassing the arm of the dog-leg shaped door hinge arm 13 that extends to the frame hinge bracket (not shown). The other piece of roller chain 31a extends around the sprocket 27 mounted on the pin 17 that passes through the door hinge bracket 19. The linear pneumatic actuator 33 joins the ends of the roller chain pieces 31a, 31b located on the side of the hinge arm 13 nearest the door 11. The snubber hydraulic device 41 of the present invention joins the ends of the roller chain pieces 31a, 31b located on the side of the hinge arm 13 furthest from the door 11. A portion of the hydraulic device is attached to the side of the hinge arm 13 furthest from door 11.

The linear pneumatic actuator 33 (shown in FIG. 2) is of a type currently known in the art of airplane door actuators. It generally includes a cylinder 35, a piston 39, and a through-rod 37. The through-rod 37 is partially affixed to the piston 39 and passes through the ends of the cylinder 35. The ends of the through-rod 37 are connected by suitable couplers 38a, 38b to the above described ends of each of the roller chain pieces 31a, 31b. Only a chamber in the cylinder on one side of the piston is connected to a source of pneumatic power. The other chamber is not so connected. Thus, the pneumatic actuator is a unidirectional actuator, the actuation direction being the door open direction. Since unidirectional pneumatic actuators 33 capable of opening an airplane door and not interfering with the closing of the door are known, no specific actuator designed to accomplish these functions is described here.

The hydraulic device 41 of the snubber includes a housing in the form of a cylinder 47, a piston 45 and a through-rod 43. The through-rod 43 is affixed to the piston 45 and passes through the ends of the cylinder 47. The ends of the through-rod 43 are connected by suitable couplers 44a, 44b to the above-described ends of each of the roller chain pieces 31a, 31b. The cylinder 47 and the piston 45 together define first and second hydraulic fluid compartments 49, 51, one located on either side of the piston 45.

In the preferred embodiment, during non-emergency operations, the door is opened by manually rotating the door handle 12 to unlock the door, and manually applying a force to move the door 11 open. In emergencies, the rotation of the door handle 12 causes the linear pneumatic actuator 33 to create the force that translates the door open. The linear pneumatic actuator 33 is activated by a door system that does not form part of the present invention and thus is not described here. As noted above, preferably the linear pneumatic actuator operates only to open the door during emergency conditions and does not interfere with the manual closing of the door.

In more detail, when a manual force is applied to open or close the door, the roller chain pieces 31a, 31b translate around the sprockets 25, 27, 29a, 29b. When the roller chain 31b moves in one direction or the other around the first sprocket 25, the hinge arm 13 is caused to rotate around the hinge connection at the door frame. At the same time, the roller chain piece 31a is also revolving around the second sprocket 27, causing it to pivot the door 11, via the door bracket 19. As the roller chain pieces 31a, 31b translate along the hinge arm 13, the hinge arm 13 maintains the door's attitude approximately parallel to the longitudinal centerline of the airplane. Therefore, as the manually applied force moves the door, but the translation of the roller chain pieces synchronizes the rotation of the hinge arm to the door with the rotation of the hinge arm to the door frame, which causes the door to move along a path that maintains the door parallel to the airplane fuselage. If the pneumatic actuator is used to open the door, the actuator through-rod 37 causes the roller chain pieces 31a and 31b to translate and indirectly open the door.

All forces applied to the roller chain pieces 31a, 31b (vis-à-vis the door 11 and/or the pneumatic actuator 33) are snubbed by the hydraulic device 41 under the control of, and according to, a flow regulation system 40. The flow regulation system 40 is shown in block form in FIG. 3, and is described below.

Figure 3:
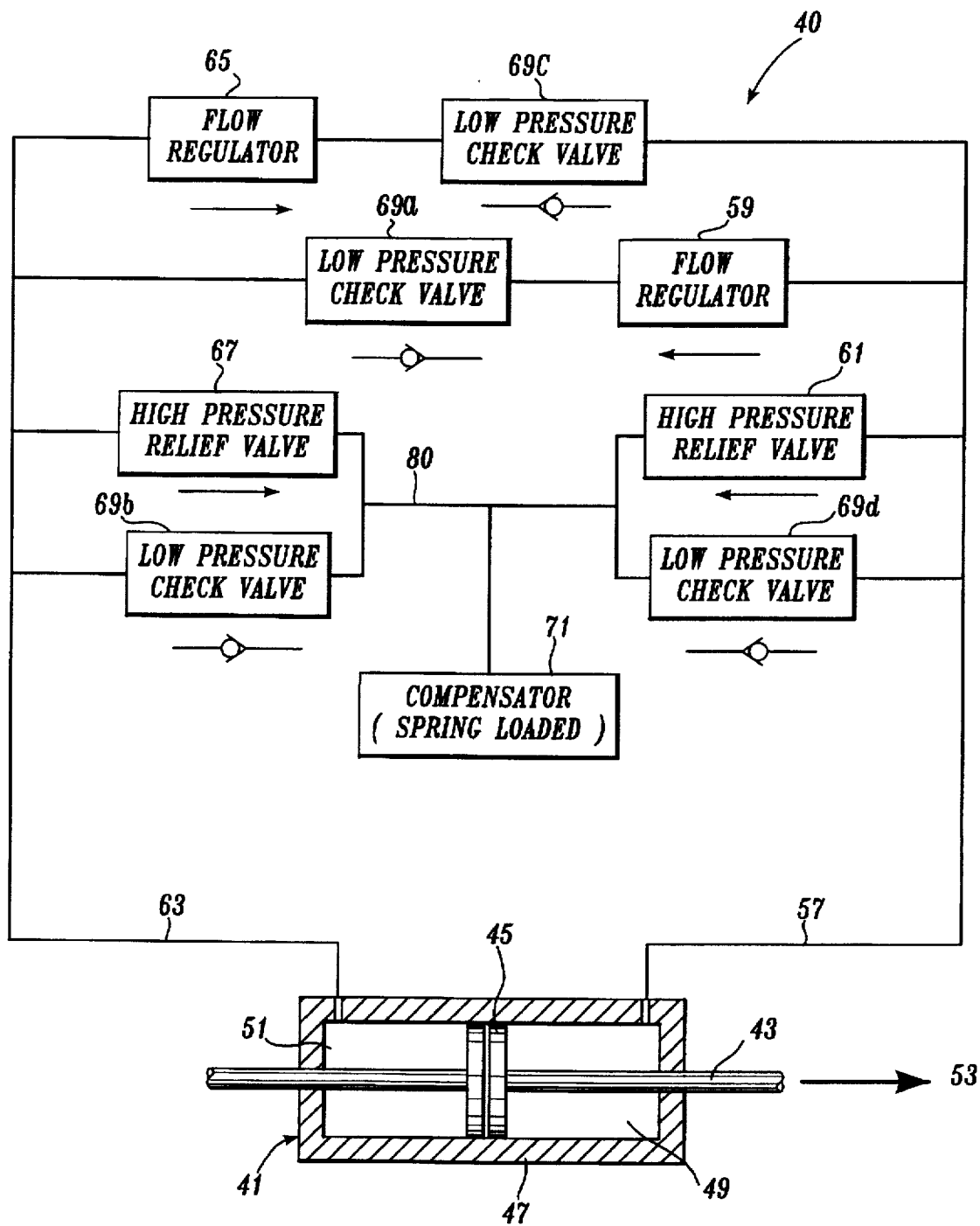
FIG. 3 is a partially block and partially pictorial diagram of a hydraulic door snubber formed in accordance with the present invention.

FIG. 3 is a partially block and partially pictorial diagram of a snubber formed in accordance with the present invention. The through-rod 43 in FIG. 3 is shown in mid-stroke, moving in the door opening direction shown by an arrow 53. The flow regulation system 40 comprises first and second conduits 57, 63; first and second flow regulators 59, 65; first and second high pressure relief valves 61, 67; four low pressure check valves 69a, 69b, 69c, 69d; and a spring loaded compensator 71. Overall, the flow regulation system 40 regulates the flow of hydraulic fluid between the compartments 49, 51 located on opposite sides of the piston 45. The flow regulation system 40 normally uses the flow regulators 59, 65 to control the rate of fluid transfer between the two compartments 49, 51, but during large applied force conditions, will use high pressure relief valves 61, 67 to quickly limit the applied force. The high pressure relief valves 61, 67 allow the door velocity to increase, thereby limiting the internal forces on the door components, potentially saving those components from yielding or failing.

Below is a description of the flow regulation system 40. First, a discussion of the components is presented. Next, the components are described in terms of their physical relation to one another. Lastly, a description of their operation is provided. A flow regulation system formed in accordance with the present invention is applicable to all types of snubbers (e.g., rotary, gear, vane, blade, etc.). It is to be understood that the discussion of a flow regulation system herein as applied to a piston type snubber is not meant to limit the present invention to piston type snubbers only. The discussion of a flow regulation system of the present invention as applied to a piston type snubber is exemplary.

With regard to the components of the flow regulation system 40, each is currently known in the art of snubbing. The novelty of the present invention does not reside in these components per se, but rather in the novel use of discrete high pressure relief in conjunction with flow regulation. Since current flow regulators, high pressure relief valves, low pressure check valves, and compensators are well known in the art, no detailed description of these components is provided.

The specific components selected for use in the present invention should be capable of performing as described herein. In particular, the flow regulator chosen should be capable of sensing the hydraulic fluid pressure difference between the faces of the snubber piston (or some related value, i.e., the velocity of the snubber through-rod or the applied force to the door) and responding to the sensed input by regulating the flow of hydraulic fluid between the compartments 49, 51. Preferably, the high pressure relief valves include a spring and ball valve that requires a certain threshold pressure in order to compress the spring and allow hydraulic fluid to pass.

The high pressure relief valve selected should be capable of quickly relieving high pressure hydraulic fluid by rapidly passing hydraulic fluid between the first and second compartments. (Obviously, if a pressure seal is used in the snubbing system it is capable of "blowing out" and thereby acting as a crude high pressure relief element, but that is not what is intended in the present invention. The present invention requires a discrete element acting for the purpose of high pressure relief.) The high pressure relief valves selected must also reseat, or close, when the high pressure is slightly reduced. Stated differently, the high pressure relief valve should close at roughly the same pressure that it opened, so that very little hysterisis between fluid pressure and through-rod velocity exists.

The compensator selected should be capable of adding or subtracting hydraulic fluid to or from the snubber to compensate for hydraulic volume changes (i.e., a slow leak, thermal changes, etc.) In the preferred embodiment, the compensator comprises a piston in a housing with hydraulic fluid on one side of the piston and a compression spring on the other side. The hydraulic fluid is in communication with a low pressure portion of the flow regulation system 40. The spring is in slight compression so that the compensator 71 keeps the hydraulic fluid under pressure at all times and continually attempts to add hydraulic fluid to the flow regulation system 40, but can just as easily accept additional hydraulic fluid from filling or thermal expansion.

With regard to the physical relation of the components, the first compartment 49 contains an outlet that is connected to the first conduit 57. The first conduit 57 is branched to reach the inputs of both the first flow regulator 59 and the first high pressure relief valve 61. FIG. 3 also shows that the third and fourth low pressure check valves 69c, 69d have their outputs connected to the first conduit 57. The output of the first flow regulator 59 is connected to the input of the first low pressure check valve 69a, which outputs to the second conduit 63. The output of the first high pressure relief valve 61 is connected to a shared passage 80 that connects to the input of the second low pressure check valve 69b. The second low pressure check valve 69b also outputs to the second conduit 63.

The above described connections are provided for use during door opening. For door closing, similar component connections are provided. Specifically, the second compartment 51 contains an outlet that is connected to the second conduit 63. The second conduit 63 is branched to reach the inputs of both the second flow regulator 65 and the second high pressure relief valve 67. The first and second low pressure check valves 69a, 69b have their outputs connected to the second conduit 63, as stated above. Downstream of the second flow regulator 65 is the third low pressure check valve 69c, which outputs to the first conduit 57. The output of the second high pressure relief valve 67 is connected to the shared passage 80, which connects to the input of the fourth low pressure check valve 69d. The fourth low pressure check valve 69d outputs to the first conduit 57. The hydraulic fluid port of the compensator 71 is also connected to the shared passage 80. Thus, the shared passage 80 therefore interconnects five items: the outputs of the first and second high pressure relief valves 61, 67; the inputs of both the second and fourth low pressure check valves 69b, 69d; and the hydraulic port of the compensator 71. The optimal position of the compensator 71 for the present invention is conventional and is shown herein to be between the inputs of the second and fourth low pressure check valves 69b, 69d. In this position, the compensator will see only low pressure. In this position, the compensator will not have to work as hard to add or subtract hydraulic fluid to or from the snubber as it would if it were located in other positions.

The operation of the flow regulation system 40 is discussed below in three sections: manual door opening operation, manual door closing operation, and actuator door opening operation. Within each section, the discussion includes the response of the system during low applied force conditions through high applied force conditions.

During door opening, the motion of the hinge arm also pushes the through-rod 43 and piston 45 of the snubber hydraulic device 47. The piston 45 forces hydraulic fluid from the first compartment 49 to flow into the first conduit 57. (For explanatory purposes, hydraulic fluid flow is defined as going from the first compartment 49 to the second compartment 51 during door opening. Likewise, during door closing, hydraulic fluid flow is defined as going from the second compartment 51 to the first compartment 49.)

When slow angular rotation of the hinge arm occurs during normal door opening, hydraulic fluid flows only from the first conduit 57, through an orifice (not shown) in the first flow regulator 59, through the first low pressure check valve 69a, through the second conduit 63 to the second chamber 51. The pressure in the first conduit 57 is insufficient to open the first high pressure relief valve 61. The third and fourth low pressure check valves 69c, 69d prevent hydraulic fluid from entering the outlet ends of either the second flow regulator 65 or the second high pressure relief valve 67. In this manner, hydraulic fluid is passed from the first compartment 49 into the second compartment 51 at a rate controlled by the first flow regulator 59 during slow angular rotation of the hinge arm.

The rate of hydraulic fluid flow through the first flow regulator 59 may be according to any schedule desired by a designer for a particular application. Preferably, the first flow regulator 59 has a spool valve (not shown) whose position depends on the difference in hydraulic pressure on opposite sides of the piston. The position of the spool valve determines the size of the orifice of the flow regulator. When the pressure difference is below a certain amount, the orifice is fully open. When the pressure increases above a certain valve, the orifice size begins to constrict to a size that keeps the rate of hydraulic fluid flow constant between the first and second compartments 49, 51. Controlling the rate of fluid flow controls the velocity of the piston 45, and the through-rod 43, and thus, the translation of the roller chain pieces 31a, 31b, and the movement of the door.

When a very large external dynamic force is applied to the door during opening or closing (such as caused by wind, pressure, airplane attitude, etc.), high angular rotation of the hinge arm occurs and a very large pressure difference exists across the flees of the piston 45. This cause the orifice of the first flow regulator 59 to constrict to a very small opening. At a certain pressure, the hydraulic fluid pressure in the first conduit 57 will be large enough to exceed the opening threshold of the first high pressure relief valve 61. When this threshold is reached, hydraulic fluid begins to pass through the first high pressure relief valve 61. Fluid passing through the first high pressure relief valve 61 enters the shared passage 80, passes through the second low pressure check valve 69b and the second conduit 63 into the second compartment 51. The first high pressure relief valve 61 adds an additional path through which hydraulic fluid quickly passes, dissipating excessive hydraulic fluid pressure by rapidly transferring fluid from the first compartment 49 to the second compartment 51.

As a side note, even though the shared passage 80 is connected to multiple components, the output of the first high pressure relief valve 61 only exits from the shared passage 80 through the second low pressure check valve 69b. This is because the output of the second high pressure relief valve 67 is connected to the shared passage 80. The hydraulic pressure in the shared passage 80 is greater than the hydraulic pressure in the second conduit 63, biasing the second high pressure relief valve closed. While the input of the fourth low pressure cheek valve 69d is connected to the shared passage 80, the high hydraulic fluid pressure on its output side is greater than that on its input side. Thus, the fourth low pressure check valve 69d is also biased closed. The compensator 71 is only open to the shared passage 80 and does not actually pass hydraulic fluid.

If the large applied force is reduced during door opening, hydraulic fluid pressure in the first compartment 49 decreases, causing the pressure in the first conduit 57 to decrease. If the hydraulic fluid pressure decreases sufficiently, the first high pressure relief valve 61 will revert back to its closed position. Thereafter, the first flow regulator 59 will operate alone, snubbing the applied force and keeping the hydraulic fluid flow rate, and hence, the door's velocity, at or below an acceptable value.

Identical regulation is provided for manual door closing. In this case, hydraulic fluid flows through the second conduit 63, through the second flow regulator 65, through the third low pressure check valve 69c, through the first conduit 57, and into the first compartment 49. The first and second low pressure check valves 69a, 69b are unaffected since they are oriented to allow hydraulic fluid to flow into, not out of, the second conduit 63. If the applied force exceeds a predetermined threshold, hydraulic fluid will also flow through the second high pressure relief valve 67, through the shared passage 80, through the fourth low pressure check valve 69d, through the first conduit 57, and into the first compartment 49. Again, even though the shared passage 80 is connected to multiple components, the output of the second high pressure relief valve 67 will flow only through the fourth low pressure check valve 69d. This is because the differential pressure across the first high pressure relief valve 61 and the second low pressure check valve 69b biases these vanes closed. The compensator 71 is only open to the shared passage 80 and does not actually pass hydraulic fluid.

Operation during emergency door opening is accomplished in a way similar to manual door opening. The significant difference being that instead of a manual force directly causing the movement of the door, the linear pneumatic actuator 33 moves the door 11 indirectly by forcing the roller chain pieces 31a, 31b to translate, which rotates the hinge arm connections to the door 11 and the door frame, urging the door to open. The snubbing device 41 and the flow regulation system 40 of the present invention snub the applied forces to the door during actuator 33 operation as during manual operation.

In summary, the first and second hydraulic fluid conduits 57, 63 each direct fluid to a flow regulator 59, 65 that operates to maintain the rate of hydraulic fluid flow between the first and second compartments 49, 51 regardless of the applied force. This allows the door to be opened and closed at an acceptable rate during normal operations with only low applied manual force. The first and second conduits 57, 63 also direct fluid to high pressure relief valves 61, 67 that rapidly dissipate excessive hydraulic fluid pressure when large applied forces are present. This prevents the door components from yielding or failing during all design operations.

While the presently preferred embodiment of the invention has been illustrated and described, it will be appreciated that various changes can be made therein without departing from the spirit and scope of the invention. For example, as noted above, while the illustrated and described snubber has been described in an airplane door translating system, it is to be understood that the snubber may find use in other environments, including other airplane environments. Further, in some airplane and other door environments, an actuator, such as the pneumatic actuator, may be unnecessary, in which use the related ends of the chains would be connected together. Further, in some environments, the chain and sprockets could be replaced by belts and pulleys or four-bar linkages. Hence, it is to be understood that, within the scope of the appended claims, this invention can be practiced otherwise and in other airplane areas where energy needs to be absorbed to control dynamic forces than as specifically described herein.

The embodiments of the invention in which an exclusive property or privilege is claimed are defined as follows:

1. A translating door system that includes a hinge arm having first and second ends, first and second sprockets, the first sprocket rotatably attached to the first end of the hinge arm, the second sprocket rotatably attached to the second end of the hinge arm, and a roller chain wrapped around the first and second sprockets, and having first and second ends, the improvement comprising a snubber, said snubber including:

(a) a hydraulic device including a housing mounted to the hinge arm, a piston located in the housing, and a through-rod connected to the piston and extending through the housing, the ends of the through-rod coupled to the first and second ends of the roller chain; the housing and the piston defining two hydraulic fluid compartments located on opposite sides of the piston; and (b) a flow regulation system in fluid communication with the two hydraulic fluid compartments for snubbing the movement of the hinge arm by controlling the rate of hydraulic fluid flow between the first and second fluid compartments, the flow regulation system comprising at least one flow regulator connected in parallel with at least one high pressure relief valve, the high pressure relief valve for relieving excessive forces applied to the door.

2. The improvement claimed in claim 1, wherein the hinge arm has a dog leg shape and the snubber hydraulic device is located on the outer side of the dog leg shaped hinge arm.

3. The improvement claimed in claim 1, wherein the flow regulation system comprises:
   (a) a first fluid conduit in communication with the first fluid compartment;
   (b) a second fluid conduit in communication with the second fluid compartment;
   (c) first and second low pressure check valves, each having an input side and an output side;
   (d) wherein the at least one flow regulator includes a first flow regulator for controlling the rate of hydraulic fluid passing from the first fluid compartment to the second fluid compartment, the first flow regulator having an input side connected to the first fluid conduit and an output side connected to the input side of the first low pressure check valve, the output side of the first low pressure check valve connected to the second fluid conduit;
   (e) a fluid passage; and
   (f) wherein the at least one high pressure relief valve includes a first high pressure relief valve for relieving excessive hydraulic fluid pressure between the first fluid compartment and the second fluid compartment, the first high pressure relief valve having an input side connected to the first fluid conduit and an output side connected to the fluid passage, the fluid passage being additionally connected to the input side of the second low pressure check valve, the output side of the second low pressure check valve connected to the second fluid conduit.

4. The improvement claimed in claim 3, further comprising a compensator connected to the fluid passage for hydraulically compensating the flow regulation system.

5. The improvement claimed in claim 3, further comprising:
   (a) third and fourth low pressure check valves, each having an input side and an output side;
   (b) wherein the at least one flow regulator further includes a second flow regulator for controlling the rate of hydraulic fluid passing from the second fluid compartment to the first fluid compartment, the second flow regulator having an input side connected to the second fluid conduit and an output side connected to the input side of the third low pressure check valve, the output side of the third low pressure check valve connected to the first fluid conduit; and
   (c) wherein the at least one high pressure relief valve further includes a second high pressure relief valve for relieving excessive hydraulic fluid pressure between the second fluid compartment and the first fluid compartment, the second high pressure relief valve having an input side connected to the second fluid conduit and an output side connected to the fluid passage, the fluid passage being additionally connected to the input side of the fourth low pressure check valve, the output side of the fourth low pressure check valve connected to the first fluid conduit.

6. The improvement claimed in claim 5, further comprising a compensator connected to the fluid passage for hydraulically compensating the flow regulation system.

7. The improvement claimed in claim 3, further comprising:
   (a) third and fourth low pressure check valves, each having an input side and an output side;
   (b) wherein the at least one flow regulator further includes a second flow regulator for controlling the rate of hydraulic fluid passing from the second fluid compartment to the first fluid compartment, the second flow regulator having an input side connected to the second fluid conduit and an output side connected to the input side of the third low pressure check valve, the output side of the third low pressure check valve connected to the first fluid conduit; and
   (c) wherein the at least one high pressure relief valve further includes a second high pressure relief valve for relieving excessive hydraulic fluid pressure between the second fluid compartment and the first fluid compartment, said second high pressure relief valve having an input side connected to the second fluid conduit and an output side connected to the input side of the fourth low pressure check valve, the output side of the fourth low pressure check valve connected to the first fluid conduit.

8. The improvement claimed in claim 7, further comprising a compensator connected to the fluid passage for hydraulically compensating the flow regulation system.

9. A flow regulation system for a snubber hydraulic device having first and second fluid compartments, the flow regulation system comprising:
   (a) a first fluid conduit in communication with the first fluid compartment;
   (b) a second fluid conduit in communication with the second fluid compartment;
   (c) first and second low pressure check valves, each having an input side and an output side;
   (d) a first flow regulator for controlling the rate of hydraulic fluid passing from the first fluid compartment to the second fluid compartment, the first flow regulator having an input side connected to the first fluid conduit and an output side connected to the input side of the first low pressure check valve, the output side of the first low pressure check valve connected to the second fluid conduit;
   (e) a fluid passage; and
   (f) a first high pressure relief valve for relieving excessive hydraulic fluid pressure between the first fluid compartment and the second fluid compartment, the first high pressure relief valve having an input side connected to the first fluid conduit and an output side connected to the fluid passage, the fluid passage being additionally connected to the input side of the second low pressure check valve, the output side of the second low pressure check valve connected to the second fluid conduit.

10. A flow regulation system for a snubber hydraulic device according to claim 9, further comprising a compensator connected to the fluid passage for hydraulically compensating the flow regulation system.

11. A flow regulation system for a snubber hydraulic device according to claim 9, further comprising:
    (a) third and fourth low pressure check valves, each having an input side and an output side;

(b) a second flow regulator for controlling the rate of hydraulic fluid passing from the second fluid compartment to the first fluid compartment, the second flow regulator having an input side connected to the second fluid conduit and an output side connected to the input side of the third low pressure check valve, the output side of the third low pressure check valve connected to the first fluid conduit; and (c) a second high pressure relief valve for relieving excessive hydraulic fluid pressure between the second fluid compartment and the first fluid compartment, the second high pressure relief valve having an input side connected to the second fluid conduit and an output side connected to the fluid passage, the fluid passage being additionally connected to the input side of the fourth low pressure check valve, the output side of the fourth low pressure check valve connected to the first fluid conduit.

12. A flow regulation system for a snubber hydraulic device according to claim 11, further comprising a compensator connected to the fluid passage for hydraulically compensating the flow regulation system.

13. A flow regulation system for a snubber hydraulic device according to claim 9, further comprising:

(a) third and fourth low pressure check valves, each having an input side and an output side;

(b) a second flow regulator for controlling the rate of hydraulic fluid passing from the second fluid compartment to the first fluid compartment, the second flow regulator having an input side connected to the second fluid conduit and an output side connected to the input side of the third low pressure check valve, the output side of the third low pressure check valve connected to the first fluid conduit; and (c) a second high pressure relief valve for relieving excessive hydraulic fluid pressure between the second fluid compartment and the first fluid compartment, said second high pressure relief valve having an input side connected to the second fluid conduit and an output side connected to the input side of the fourth low pressure check valve, the output side of the fourth low pressure check valve connected to the first fluid conduit.

14. A flow regulation system for a snubber hydraulic device according to claim 13, further comprising a compensator connected to the fluid passage for hydraulically compensating the flow regulation system.

15. A translating door system that includes a hinge arm having first and second ends, first and second sprockets, the first sprocket rotatably attached to the first end of the hinge arm, the second sprocket rotatably attached to the second end of the hinge arm, and a roller chain wrapped around the first and second sprockets, the roller chain having first and second ends, the improvement comprising a snubber, said snubber including:

(a) a hydraulic device including a housing mounted to the hinge arm, a piston located in the housing, and a through-rod connected to the piston and extending through the housing, the ends of the through-rod coupled to the first and second ends of the roller chain; the housing and the piston defining two hydraulic fluid compartments located on opposite sides of the piston; and (b) a flow regulation system in fluid communication with the two hydraulic fluid compartments for snubbing the movement of the hinge arm by controlling the rate of hydraulic fluid flow between the first and second fluid compartments, the flow regulation system comprising at least one flow regulator in the form of a constant flow rate valve with a variable area orifice; wherein during normal operations, varying the size of the orifice results in a generally constant door velocity.

16. The improvement according to claim 15, wherein the at least one flow regulator includes a spool valve, wherein the position of a spool determines the size of the orifice of the flow regulator.

17. The improvement according to claim 15, wherein the flow regulation system further includes at least one high pressure relief valve for relieving excessive forces applied to the door.

18. The improvement according to claim 17, wherein the at least one flow regulator is connected in parallel with the at least one high pressure relief valve.

19. The improvement according to claim 17, wherein the at least one high pressure relief valve includes a spring and ball valve that requires a certain threshold pressure in order to compress a spring and allow hydraulic fluid to pass.

* * * * *

UNITED STATES PATENT AND TRADEMARK OFFICE
CERTIFICATE OF CORRECTION

PATENT NO. : 5,687,452
DATED : November 18, 1997
INVENTOR(S) : T. Hamatani et al.

It is certified that error appears in the above-identified patent and that said Letters Patent is hereby corrected as shown below:

COLUMN      LINE

| | | | | |
|---|---|---|---|---|
| [56] | Refs. Cited | Please insert the following references: | | |
| Pg. 1, col. 1 | (U.S. Pat. | --3,572,363 | 3/1971 | Roach |
| | Docs.) | 3,864,875 | 2/1975 | Hewitt |
| | | 3,940,887 | 3/1976 | Slaybaugh |
| | | 4,296,570 | 10/1981 | Balbach et al. |
| | | 4,543,746 | 10/1985 | Racca |
| | | 4,607,812 | 8/1986 | De Haan et al. |
| | | 5,289,615 | 3/1994 | Banks et al. |
| | | 5,379,971 | 1/1995 | Kim et al.-- |

Signed and Sealed this

Third Day of March, 1998

Attest:

BRUCE LEHMAN

Attesting Officer      Commissioner of Patents and Trademarks